Nov. 1, 1938.
J. D. WILHOIT
2,134,934
DENTAL INSTRUMENT
Filed May 17, 1937
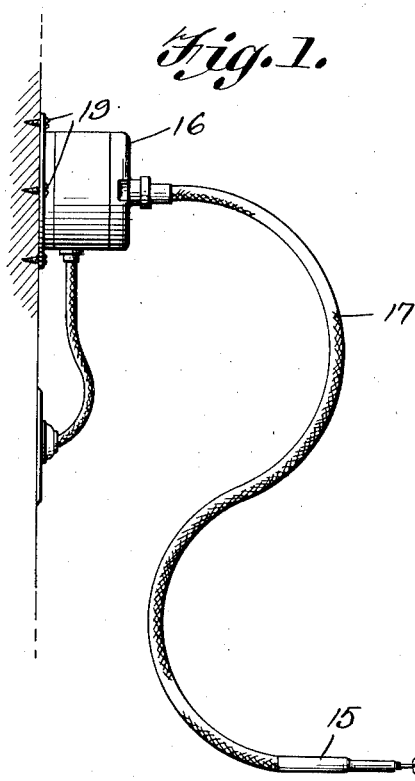
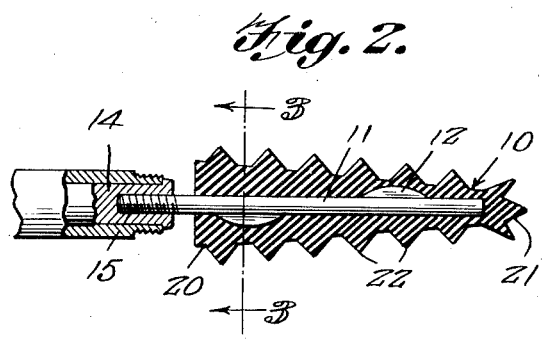
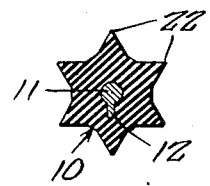
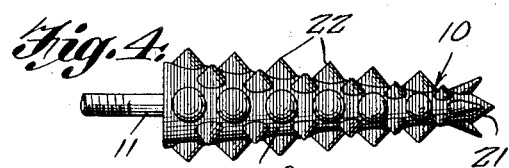
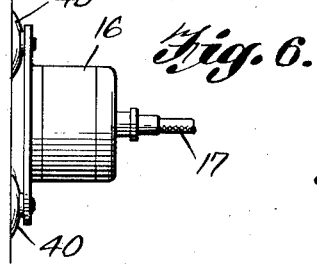
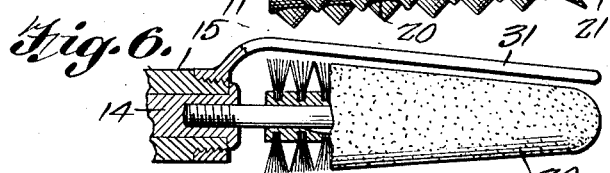
Joseph D. Wilhoit,
INVENTOR Patented Nov. 1, 1938

2,134,934

UNITED STATES PATENT OFFICE 2,134,934

DENTAL IMPLEMENT

Joseph D. Wilhoit, Louisville, Ky.

Application May 17, 1937, Serial No. 143,155

1 Claim. (Cl. 15—23)

This invention relates to improvements in dental implements and more particularly to that class utilized for cleaning the teeth.

It is well known, that particles of food become firmly lodged between the teeth and are not removed in an effective manner by the usual "brushing" operation until after disintegration. This condition promotes decay of the teeth and oftentimes pyorrhea and other mouth and gum diseases. The lodging of particles of food is especially prevalent between the molars and bicuspids and usually at the neck thereof.

One of the principal objects of my invention is to provide means for effectively removing the particles of food lodged between the teeth and at the same time massaging the gum tissues surrounding the necks of the teeth, thus stimulating circulation with resultant healthy tissues.

Another object of my invention is to provide means for effectively removing the particles of food lodged between the teeth and at the same time polishing the teeth.

Other objects and advantages will be apparent from the following description, appended claim and annexed drawing.

Referring to the drawing wherein like reference characters designate like parts throughout the several views:

Fig. 1 is a side elevation of my invention and illustrating the means for operating the same.

Fig. 2 is a longitudinal sectional view of the tooth cleaning implements and associated parts.

Fig. 3 is a sectional view taken on a line 3—3 of Fig. 2.

Figs. 4 and 5 are side elevations of the tooth cleaning implement.

Fig. 6 is a modified form of mounting for the motor.

My invention, in the preferred embodiment illustrated, comprises a tooth cleaning implement 10 preferably constructed of semi-soft or resilient material, such as rubber, formed with a longitudinally extending metal core member 11. The core member is equipped with laterally extending flanges 12 for anchoring the same in position and is threaded at the outer end thereof to form a detachable connection with a coupling 14 journaled in a hand-piece 15. The drive shaft of a suitable electric motor 16 is provided with a flexible shaft 17, connected to the coupling 14 and serves to rotate the implement 10. Screws 19 serve to secure the motor to a wall or like support.

The tooth cleaning element comprises an elongated, frusto-conical body 20 formed with a reduced cone-shaped member 21 whose base coincides with the small base of the frusto-conical body 20 and whose major axis coincides with the major axis of said body 20. The outer periphery of said body is provided with a plurality of laterally extending cone-shaped members 22. It will be noted from Figs. 2–5 that the members 22 located adjacent the cone-shaped member 21 are of oblique conical shape and are inclined toward said member 21. Due to the location of their vertexes in a plane intersecting said member 21 between the vertex and base thereof and substantially normal to its major axis, these members will be in position to contact the necks of the teeth on the faces thereof abutting the marginal line of the gums, and clean and massage the same when the vertex of member 21 is positioned between adjacent teeth perpendicular to the plane thereof and rotated. Due to the vertex angles of these members being smaller than that of member 21, they will be resiliently deformed in a direction opposite to the direction of rotation of member 21, while the latter member due to its greater vertex angle will resist deformation and will steady the rotary movement of the body 20 about its major axis.

From the above it will be seen that my improved dental implement provides two cleaning and massaging actions. One is tangential to the frontal surfaces of the teeth, when the implement is extended alongside and in front of the teeth between the latter and the proximate inner wall of the mouth. This action is generally similar in effect, to the "up and down" motion employed with the ordinary tooth brush.

The other action is a rotary one in the plane of the teeth surfaces and by means of which the marginal line of the teeth and gums is cleaned of all foreign matter as well as massaged by the oblique conical members 22 while the conical member 21 cleans the spaces between the teeth in its rotation. If the implement is positioned to overlie the teeth at either side of the mouth, the top surfaces of these teeth may be cleaned and at the same time, the gum portion projecting above the last or wisdom tooth may be massaged by the oblique conical members 22 in their rotation.

As illustrated in Fig. 6, suction cups 40 are secured to the motor for engagement with a wall or like support instead of the screws 19 illustrated in Fig. 1.

To effect a high degree of sanitation, the implements, in cases where several persons desire to use the same motor, are constructed of various colors (as indicated in Figures 4 and 5) to readily identify them for individual use.

It is to be understood that various changes and modifications in construction may be resorted to without departing from the spirit of the invention or scope of the appended claim.

Having described my invention, what I claim is:

A resilient dental implement comprising an elongated, frusto-conical body formed with cone-shaped, resilient side members and a similar shaped, resilient end member having a base coincident with the smaller base of said body and a major axis coincident with the major axis of said body, some of said side members formed on said body adjacent said end member, said adjacent side members having a more acute vertex angle than said end member and having an oblique-conical shape, inclined toward said end member and having vertexes located in a plane intersecting said end member and substantially normal to the major axis thereof, whereby upon rotation of said body about its major axis, said oblique-conical side members will be resiliently deformed in a direction opposite to the direction of rotation of said body to effect a cleaning of the necks of the teeth on the faces thereof abutting the marginal line of the gum and a massaging of the adjacent gum tissues, and said cone-shaped end member will be only imperceptibly deformed where it contacts adjacent teeth to effectively clean the spaces therebetween and provide a relatively stable rotational axis for said implement.

JOSEPH D. WILHOIT.